(12) United States Patent
Leone et al.

(10) Patent No.: US 8,963,520 B1
(45) Date of Patent: Feb. 24, 2015

(54) SYSTEM AND METHOD TO SOFT-START SYNCHRONOUS BUCK CONVERTERS

(71) Applicant: Maxim Integrated Products, Inc., San Jose, CA (US)

(72) Inventors: Salvatore Leone, Catanzaro (IT); Andrea Milanesi, Milan (IT)

(73) Assignee: Maxim Integrated Products, Inc., San Jose, CA (US)

(*) Notice: Subject to any disclaimer, the term of this patent is extended or adjusted under 35 U.S.C. 154(b) by 0 days.

(21) Appl. No.: 13/795,570

(22) Filed: Mar. 12, 2013

(51) Int. Cl.
  G05F 1/56 (2006.01)
  G05F 1/46 (2006.01)
(52) U.S. Cl.
  CPC .................................. *G05F 1/468* (2013.01)
  USPC .......................................... 323/271; 323/288
(58) Field of Classification Search
  USPC ......... 323/271, 282, 283, 284, 285, 288, 289, 323/290
  See application file for complete search history.

(56) References Cited

U.S. PATENT DOCUMENTS

| 4,605,997 | A  | * | 8/1986  | Kirk            | 363/16  |
| 4,683,529 | A  | * | 7/1987  | Bucher, II      | 363/44  |
| 4,794,507 | A  | * | 12/1988 | Cavigelli       | 363/86  |
| 5,488,552 | A  | * | 1/1996  | Sakamoto et al. | 363/97  |
| 6,037,887 | A  | * | 3/2000  | Wu et al.       | 341/143 |
| 6,737,841 | B2 | * | 5/2004  | Wrathall        | 323/282 |
| 7,519,135 | B2 | * | 4/2009  | Staszewski et al. | 375/346 |
| 7,692,417 | B2 | * | 4/2010  | Dagher          | 323/285 |
| 8,193,798 | B1 | * | 6/2012  | Pace et al.     | 323/284 |
| 2013/0083579 | A1 | * | 4/2013 | Gaknoki et al. | 363/131 |

* cited by examiner

*Primary Examiner* — Adolf Berhane
*Assistant Examiner* — Nusrat Quddus

(57) ABSTRACT

A system includes a feedback module that communicates with a capacitor connected across an output of a power converter and that generates a feedback voltage indicating a pre-bias voltage across the capacitor before power is supplied to the power converter. A comparator compares the feedback voltage to a reference voltage and determines whether the pre-bias voltage across the capacitor is greater or less than a desired output voltage of the power converter when power is supplied to the power converter. A ramp generator module generates a first or second ramp if the pre-bias voltage is less or greater than the desired output voltage. A control module drives high-side and low-side switches to charge or discharge the capacitor from the pre-bias voltage to the desired output voltage based on the first or second ramp and controls the power converter after a voltage across the capacitor reaches the desired output voltage.

10 Claims, 5 Drawing Sheets

SYSTEM AND METHOD TO SOFT-START SYNCHRONOUS BUCK CONVERTERS

FIELD

The present disclosure relates generally to power supplies and more particularly to systems and methods to soft-start synchronous buck converters.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many DC-to-DC converters require relatively large amounts of input current at startup (i.e., when power is initially applied). A power source supplying input power to the converter, however, may be current-limited or may have poor load regulation. Accordingly, the input voltage supplied by the power source to the converter may be pulled down when relatively large amounts of input current is required at startup.

A soft-start function minimizes the large input current at startup by gradually increasing current limit at startup, slowing a rate of rise of the output voltage of the converter, and reducing peak current required at startup. This prevents the input voltage of the converter from dropping when the power source is connected to the converter at startup.

SUMMARY

A system comprises a feedback module, a comparator, a ramp generator module, and a control module. The feedback module communicates with a capacitor connected across an output of a power converter and generates a feedback voltage indicating a pre-bias voltage across the capacitor before power is supplied to the power converter. The comparator compares the feedback voltage to a reference voltage and determines whether the pre-bias voltage across the capacitor is greater or less than a desired output voltage of the power converter when power is supplied to the power converter. The ramp generator module generates a first ramp in response to the pre-bias voltage being less than the desired output voltage and generates a second ramp in response to the pre-bias voltage being greater than the desired output voltage. The control module that drives a high-side switch and a low-side switch of the power converter to charge the capacitor from the pre-bias voltage to the desired output voltage based on the first ramp, or discharge the capacitor from the pre-bias voltage to the desired output voltage based on the second ramp, and controls the high-side switch and the low-side switch of the power converter after a voltage across the capacitor reaches the desired output voltage.

In other features, the ramp generator module generates the reference voltage. The reference voltage is set to a set-point corresponding to the desired output voltage when power is supplied to the power converter. The reference voltage is increased from a first value to the set-point based on the first ramp or decreased from a second value to the set-point based on the second ramp.

In other features, the control module operates the power converter at a duty cycle after the voltage across the capacitor reaches the desired output voltage and regulates the voltage across the capacitor at the desired output voltage based on the duty cycle.

In other features, the control module includes a pulse width modulation controller, an inductor, and the capacitor. The pulse width modulation controller controls the high-side switch and the low-side switch of the power converter at a duty cycle. The inductor has a first end that is connected to a node connecting the high-side switch to the low-side switch and a second end that is connected to the capacitor. The pulse width modulation controller controls the high-side switch and the low-side switch at the duty cycle and regulates the voltage across the capacitor at the desired output voltage based on the duty cycle after the voltage across the capacitor reaches the desired output voltage.

In other features, the control module operates the power converter in a source-only mode during the first ramp and in a sink-only mode during the second ramp.

In still other features, a method comprises generating a feedback voltage indicating a pre-bias voltage across a capacitor connected across an output of a power converter before power is supplied to the power converter. The method further comprises comparing the feedback voltage to a reference voltage to determine whether the pre-bias voltage across the capacitor is greater or less than a desired output voltage of the power converter when power is supplied to the power converter. The method further comprises generating a first ramp in response to the pre-bias voltage being less than the desired output voltage and charging the capacitor from the pre-bias voltage to the desired output voltage based on the first ramp. The method further comprises generating a second ramp in response to the pre-bias voltage being greater than the desired output voltage and discharging the capacitor from the pre-bias voltage to the desired output voltage based on the second ramp. The method further comprises controlling the power converter after a voltage across the capacitor reaches the desired output voltage.

In other features, the method further comprises setting the reference voltage to a set-point corresponding to the desired output voltage when power is supplied to the power converter; increasing the reference voltage from a first value to the set-point based on the first ramp; and decreasing the reference voltage from a second value to the set-point based on the second ramp.

In other features, the method further comprises operating the power converter at a duty cycle after the voltage across the capacitor reaches the desired output voltage; and regulating the voltage across the capacitor at the desired output voltage based on the duty cycle.

In other features, the method further comprises controlling a high-side switch and a low-side switch of the power converter using pulse width modulation at a duty cycle; and regulating the voltage across the capacitor at the desired output voltage based on the duty cycle after the voltage across the capacitor reaches the desired output voltage.

In other features, the method further comprises the control module operating the power converter in a source-only mode during the first ramp, and operating the power converter in a sink-only mode during the second ramp.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
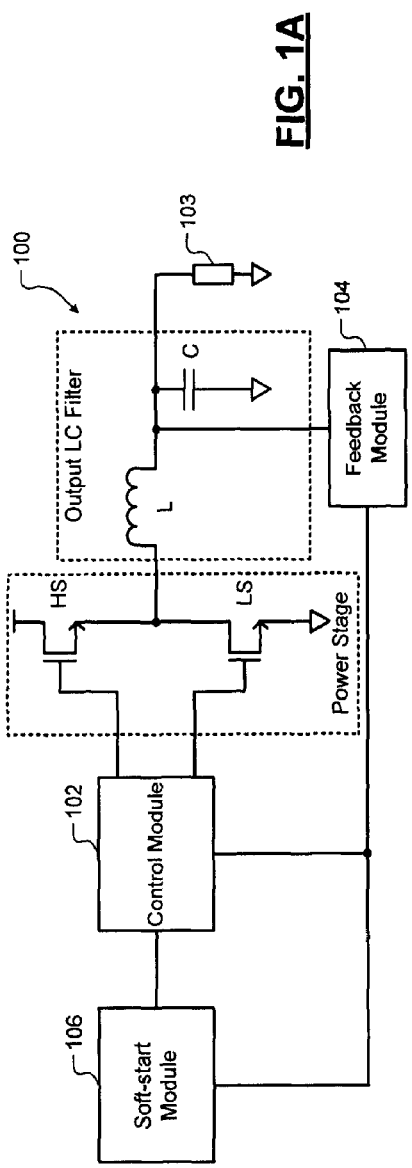
FIG. 1A is a schematic of a synchronous buck converter according to the present disclosure.

A synchronous buck converter is a buck converter that has sink/source capability (e.g., see FIG. 1A), where an output capacitor can be charged when a high-side switch of the buck converter is turned on or discharged when a low-side switch of the buck converter is turned on. An asynchronous buck converter uses a diode instead of the low-side switch. An anode of the diode is connected to ground, and a cathode of the diode is connected to an inductor. Asynchronous buck converters are source-only buck converters. That is, the asynchronous buck converters can only deliver current to the load.

Power converters such as Buck converters use several techniques to charge an output capacitance from 0V to a target voltage at startup. The general assumption is that the output voltage starts from 0V. This is not always true, however, especially in a Buck converter having sink/source capability.

The present disclosure relates to systems and methods that soft-start DC-to-DC converters with pre-biased output capacitors. The pre-biased output capacitors are output capacitors that are charged to a voltage below or above a target output voltage $V_{out}$ when the converter is initially turned on. Suppose V_max is a maximum regulated output voltage, and V_target is a user-programmable set point for a target output voltage $V_{out}$. As explained below, a ramp to soft-start the converter can be either positive (0V to V_target) or negative (V_max to V_target) depending on whether the output capacitor of the converter is charged to a voltage below or above the target output voltage $V_{out}$ when power is initially applied to the converter.

Specifically, to soft-start the converter according to the present disclosure, a feedback from the output capacitor is initially compared to a target reference voltage, which is the user-programmable set point. Based on the comparison, a positive or negative ramp is generated to charge the output capacitor from a lower pre-bias voltage to the target output voltage $V_{out}$ or to or discharge the output capacitor from a higher pre-bias voltage to the target output voltage $V_{out}$.

In the case of the positive ramp, an internal reference voltage is ramped up from 0V to the target reference voltage $V_{out}$. Low Side (LS) conduction is enabled for positive current only, and the converter operates in a source-only mode until the end of the positive ramp. At the end of the positive ramp, soft-start is complete, and PWM control of the converter is enabled.

In case of the negative ramp, the internal reference voltage is ramped down from a maximum allowed reference voltage to the reference target. High Side (HS) turn on is blanked, and the converter operates in a sink-only mode until the end of the negative ramp. At the end of the negative ramp, soft-start is complete, and PWM control of the converter is enabled.

In summary, according to the present disclosure, soft-start is performed regardless of the pre-bias condition. That is, regardless whether the output capacitor is pre-biased to a voltage below or above the target output voltage $V_{out}$. At turn on, a pre-bias voltage of the output capacitor is compared to the target reference voltage to determine whether the pre-bias voltage is below or above the target output voltage $V_{out}$. The soft-start is performed based on the positive ramp if the pre-bias condition is below regulation, where the converter operates in a source-only mode. The soft-start is performed based on the negative ramp if the pre-bias voltage is above target output voltage $V_{out}$, where the converter operates in a sink-only mode.

Figure 1B:
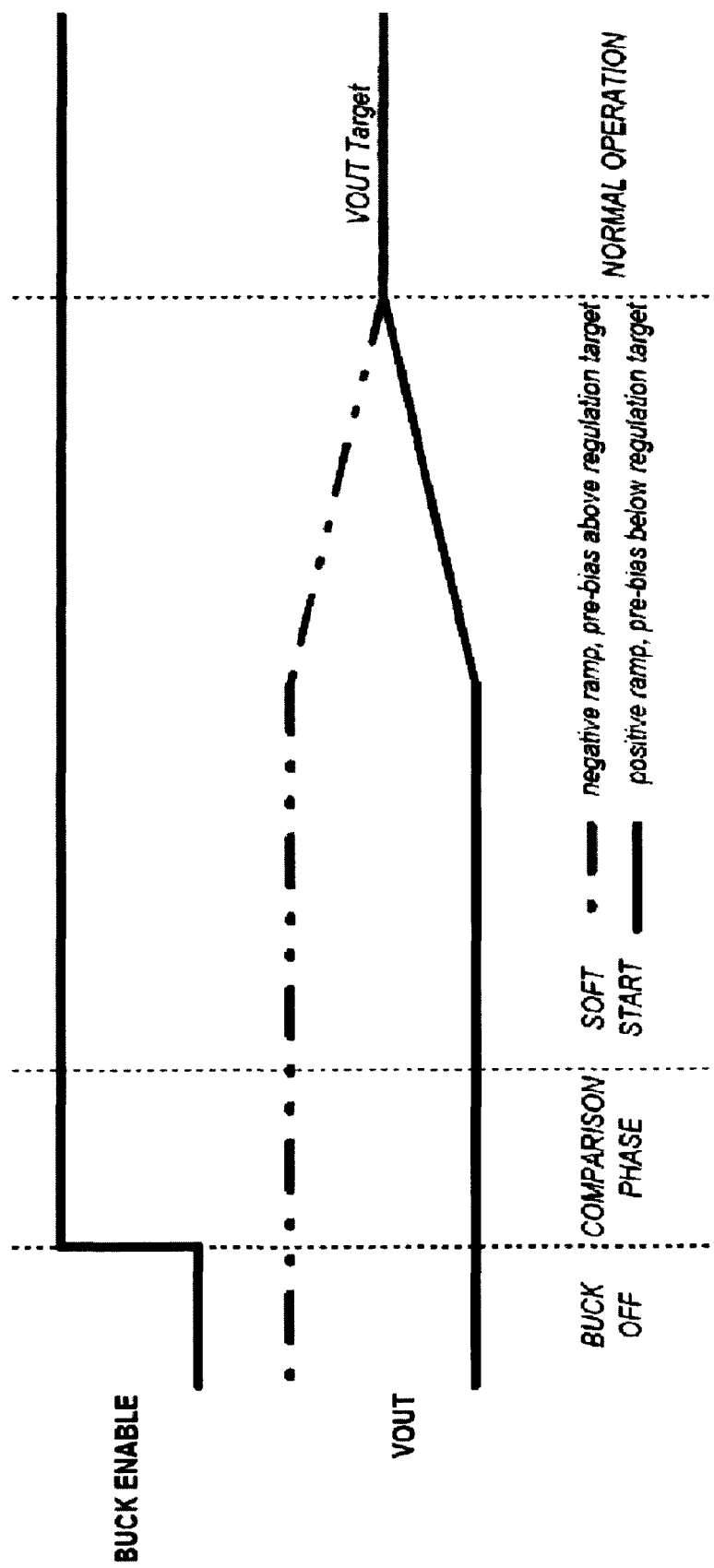
FIG. 1B is a timing diagram showing the timing of signals used to soft-start the power converter of FIG. 1A according to the present disclosure.

Referring now to FIGS. 1A and 1B, a power converter 100 according to the present disclosure is shown. In FIG. 1A, the power converter 100 includes a high-side switch (HS), a low-side switch (LS), an inductor L, and a capacitor C connected as shown. The HS switch and the LS switch are referred to as a power stage of the power converter 100. The inductor L and the capacitor C are referred to as an output LC filter.

The power converter 100 further includes a control module 102 that controls the high-side switch and the low-side switch to deliver power to a load 103. For example, the control module 102 may include a pulse width modulation (PWM) controller that controls the HS switch and the LS switch to deliver power to the load 103, where the power is regulated according to a duty cycle. The control module 102 receives several input and output signals that drive the LS and HS switches. The power converter 100 further includes a feedback module 104 and a soft-start module 106 that operate as described below.

The feedback module 104 communicates with the capacitor C connected across the load 103 as shown. The feedback module 104 generates a feedback voltage indicating a pre-bias voltage across the capacitor C before power is supplied to the power converter 100. Depending on the application setup, the feedback voltage can be $V_{out}$ itself or an output of a resistor divider connected between $V_{out}$ and a reference potential (e.g., ground). The soft-start module 106 includes a comparator and a ramp generator module, which are described below in detail with reference to FIG. 2A.

In brief, as shown in FIG. 1B, a timing diagram shows desired behavior (desired $V_{out}$ waveform) when the power converter 100 is turned on. The desired behavior is shown for both pre-bias condition above regulation target (shown by dashed line) and pre-bias condition below regulation target (shown by solid line). The comparator compares the feedback voltage to a reference voltage at startup and determines whether the pre-bias voltage across the capacitor C is greater or less than a desired output voltage of the power converter 100. The ramp generator module generates a first ramp (a positive ramp) if the pre-bias voltage is less than the desired output voltage and generates a second ramp (a negative ramp) if the pre-bias voltage is greater than the desired output voltage.

The control module 102 charges the capacitor C from the pre-bias voltage to the desired output voltage based on the first ramp and discharges the capacitor C from the pre-bias voltage to the desired output voltage based on the second ramp. At the end of the first or second ramp, the soft-start ends, and the control module 102 controls the power converter 100 normally (e.g., in a PWM mode) after the voltage across the capacitor C reaches the desired output voltage at the end of the first or second ramp.

In case of a positive voltage ramp at startup (consequent to detection of $V_{out}$ capacitor pre-biased below regulation target), a zero crossing comparator (a comparator toggling when inductor current crosses 0 A) is active until soft-start ends, in order to prevent inductor current from going negative (i.e., soft-start is performed in source-only mode). Conversely, in case of negative voltage ramp at startup (consequent to detection of $V_{out}$ capacitor pre-biased above regulation target), HS conduction is prevented until soft-start ends, in order to prevent the current from going positive (i.e., soft-start is performed in sink-only mode).

Figure 2A:
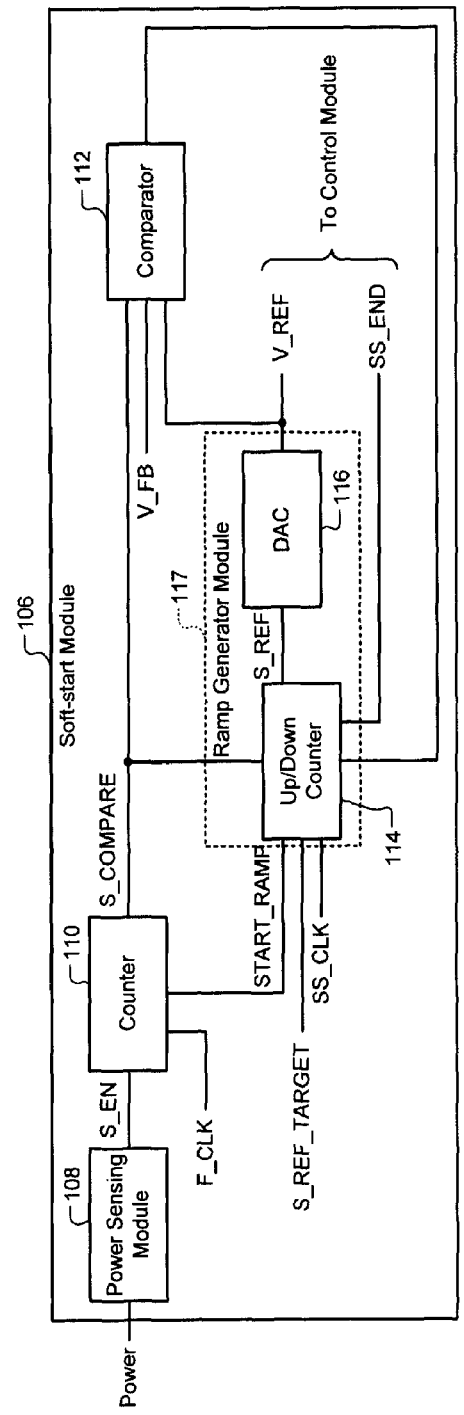
FIG. 2A is a functional block diagram of a soft-start module used to soft-start the power converter to FIG. 1A.
Figure 2B:
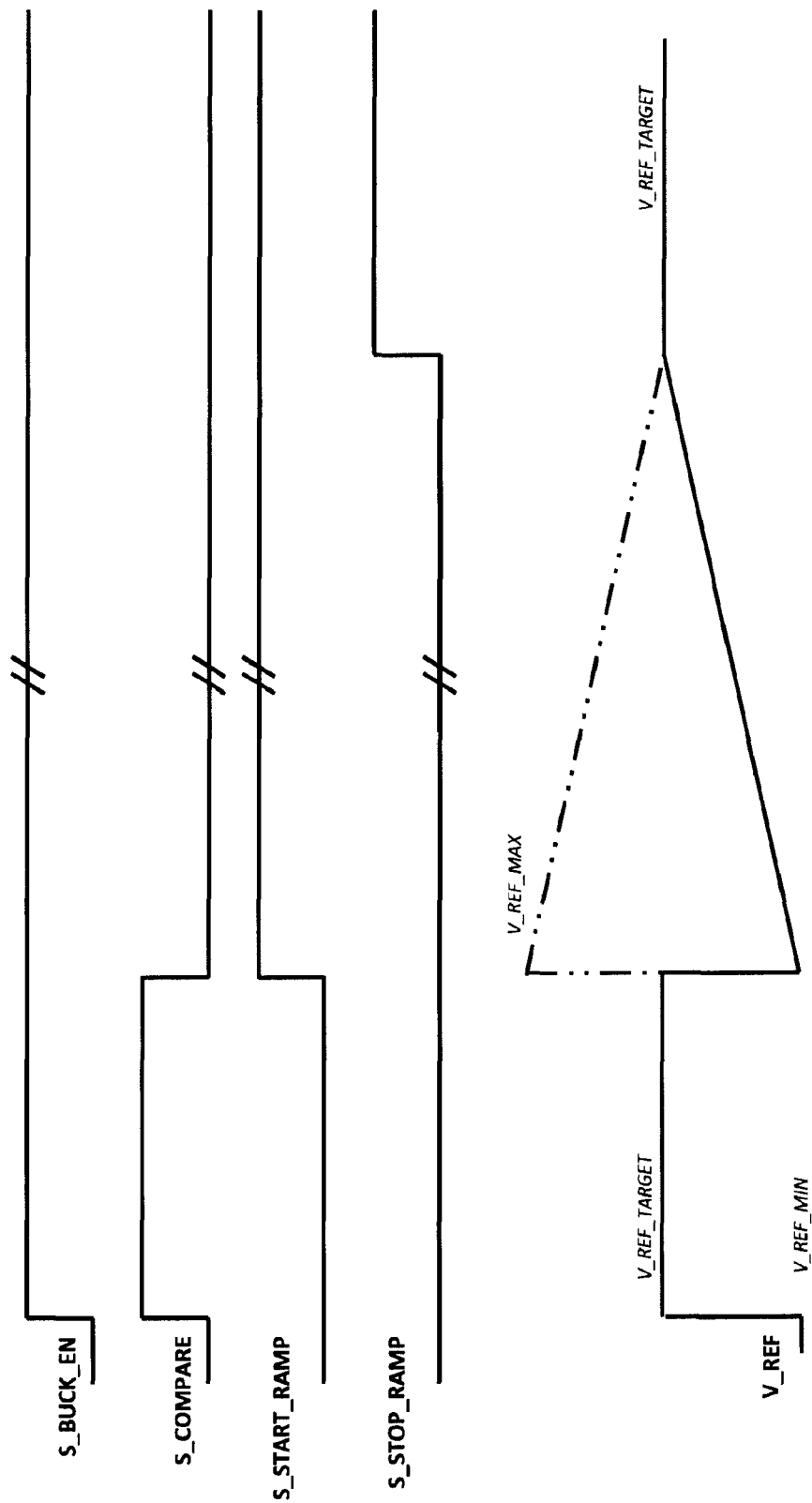
FIG. 2B is a timing diagram showing the timing of signals used by the soft-start module of FIG. 2A.
Figure 2C:
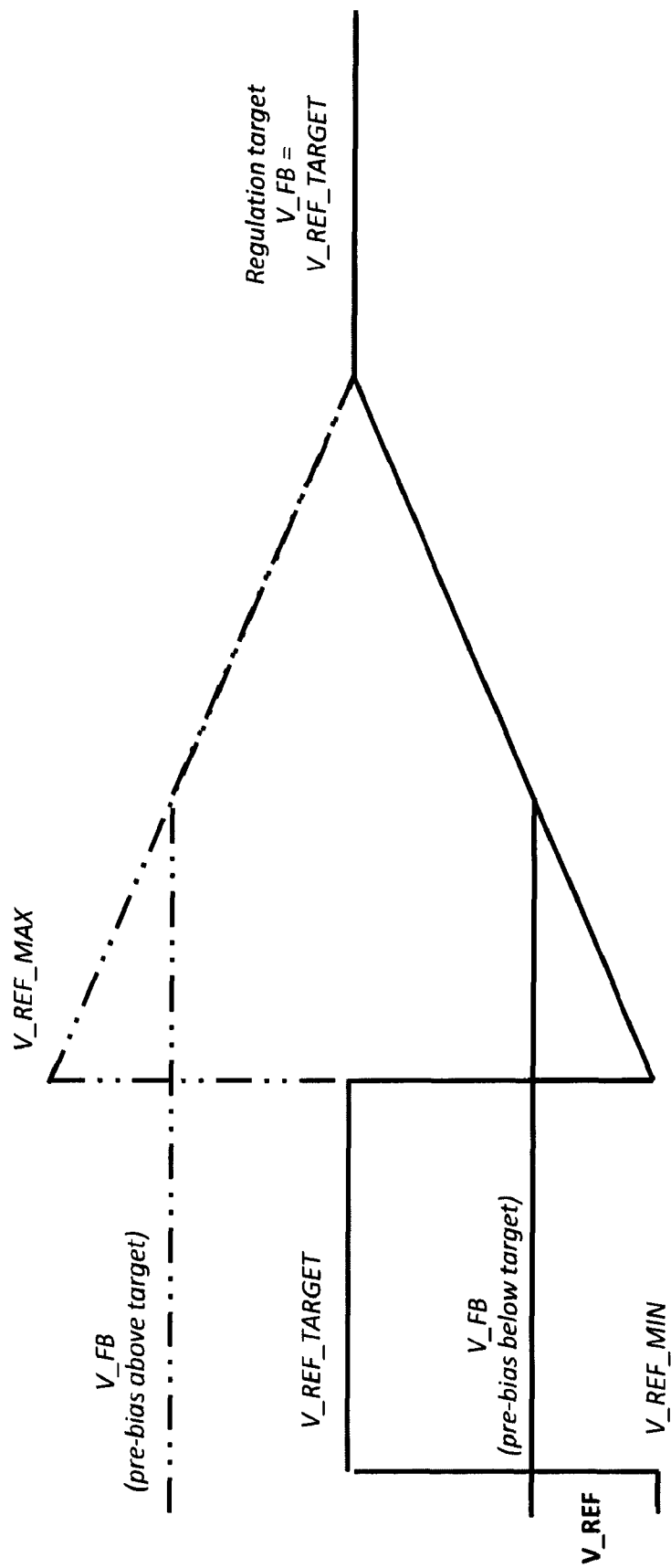
FIG. 2C is a timing diagram showing the timing of positive and negative ramps used by the soft-start module of FIG. 2A.

Referring now to FIGS. 2A-2C, the operation of the soft-start module 106 is explained in detail. In FIG. 2A, the soft-start module 106 is shown in detail. In FIG. 2B, the timing of signals used by the soft-start module 106 is shown. In FIG. 2C, the timing of positive and negative reference ramps (ramp generator output) and the resulting behavior at feedback node is shown.

In FIG. 2A, the soft-start module 106 includes a power sensing module 108, a counter 110, a comparator 112, and a ramp generator module 117. The ramp generator module 117 which includes an up/down counter 114 and a DAC 116. The power sensing module 108 senses when power is initially applied to the power converter 100 at startup and generates a control signal called soft-start enable, S_EN. The soft-start module 106 begins soft-start on receiving the soft-start enable signal, S_EN.

The counter 110 operates based on a clock signal F_CLK having a fixed frequency. For example only, the fixed frequency may be 1 MHz. On receiving the soft-start enable signal, the counter 110 may generate a timing window of a predetermined duration. For example only, the predetermined duration may be 30 μs. During the timing window, the comparator 112 compares a feedback voltage V_FB generated by the feedback module 104 to an internal reference voltage V_REF. The internal reference voltage V_REF is generated as follows.

In FIG. 2A, a digital soft-start is shown, which means S_REF_TARGET and S_REF are buses. The buses are identified by a notation of the form BUS_NAME<n:0>, which means that a bus called BUS_NAME is an (n+1)-bit bus, where BUS_NAME<n> is a bus MSB and BUS_NAME<0> is a bus LSB.

A user programmable input S_REF_TARGET (shown as a bus) can be used to set regulation target (i.e., a desired or target output voltage of the power converter 100 regulated by the control module 102). Based on the user programmable input S_REF_TARGET, the up/down counter 114 outputs a reference value S_REF (shown as a bus) to the DAC 116. The DAC 116 generates the reference voltage V_REF based on the reference value S_REF. When S_REF=S_REF_TARGET, V_REF=V_REF_TARGET. The up/down counter 114 operates based on a soft-start clock F_SS_CLK, which may be user programmable to achieve a programmable soft-start time.

While FIG. 2A shows a digital soft-start, the soft-start process described herein is also applicable in case of an analog soft-start. For example, the reference voltage V_REF need not be an output of a DAC, but may be a voltage across a capacitor charged/discharged with a current. Other analog components and/or circuits may be used instead to generate the reference voltage V_REF.

As shown in FIGS. 2B and 2C, at a rising edge of the soft-start enable signal S_EN, the counter 110 sets an output S_COMPARE of the counter 110 to a high logic level for a predetermined duration (e.g., 30 microseconds). Throughout the present disclosure, terms such as rising edge and high logic level are used for example only. Depending on implementation, a falling edge and a low logic level may be used instead.

During the time that the output S_COMPARE remains high, the up/down counter 114 sets S_REF=S_REF_TARGET. Accordingly, the DAC 116 outputs V_REF=V_REF_TARGET. During the time that the output S_COMPARE remains high, the comparator 112 compares V_FB to V_REF_TARGET to determine the pre-bias condition of the capacitor C. That is, the comparator 112 determines whether the voltage across the capacitor C is above or below the regulation target (i.e., the desired regulated output voltage). The comparator 112 latches the result of the comparison and generates a control signal S_POS indicating the pre-bias condition of the capacitor C.

At a falling edge of the output S_COMPARE, that is, at the end of the timing window of the predetermined duration, the counter 110 asserts a signal START_RAMP to begin soft-start. Based on the status of the output of the comparator 112, that is, based on the pre-bias condition of the capacitor C, the up/down counter 114 and the DAC 116 generate a positive ramp or a negative ramp as follows.

If the comparator 112 indicates that the voltage across the capacitor C is below regulation target, the up/down counter 114 counts up from all zeros to the value S_REF_TARGET. Conversely, if the comparator 112 indicates that the voltage across the capacitor C is above regulation target, the up/down counter 114 counts down from all ones to the value S_REF_TARGET.

Accordingly, the DAC 116 generates a positive ramp V_REF from V_REF_MIN to V_REF_TARGET or a negative ramp V-REF from V_REF_MAX to V_REF_TARGET. In either case, when the positive or negative ramp reaches its end value (i.e., when S_REF=S_REF_TARGET), the output of the DAC 116 reaches the target reference voltage (i.e., V_REF=S_REF_TARGET).

At this point, the up/down counter 114 generates a control signal SS_END (also called S_STOP_RAMP) to indicate end of soft-start. The soft-start module 106 outputs the control signal indicating the end of soft-start to the control module 102. On receiving the control signal indicating the end of soft-start, the control module 102 begins normal operation (e.g., PWM mode) and controls the high side and low side switches to deliver power to the load 103. The control module 102 also receives V_REF from the soft-start module 106, which generated based on S_REF_TARGET input by the user, and delivers the output power to the load 103 at the desired regulation target.

During soft-start, the soft-start module 106 prevents negative inductor current in case of the positive ramp until the control signal SS_END goes high. Accordingly, in case of the positive ramp, the power converter 100 operates in source-only mode (i.e., the power converter 100 can only deliver current to the capacitor C during soft-start). Conversely, in case of the negative ramp, the power converter 100 operates in sink-only mode (i.e., the power converter 100 can only sink current during soft-start).

Figure 3:
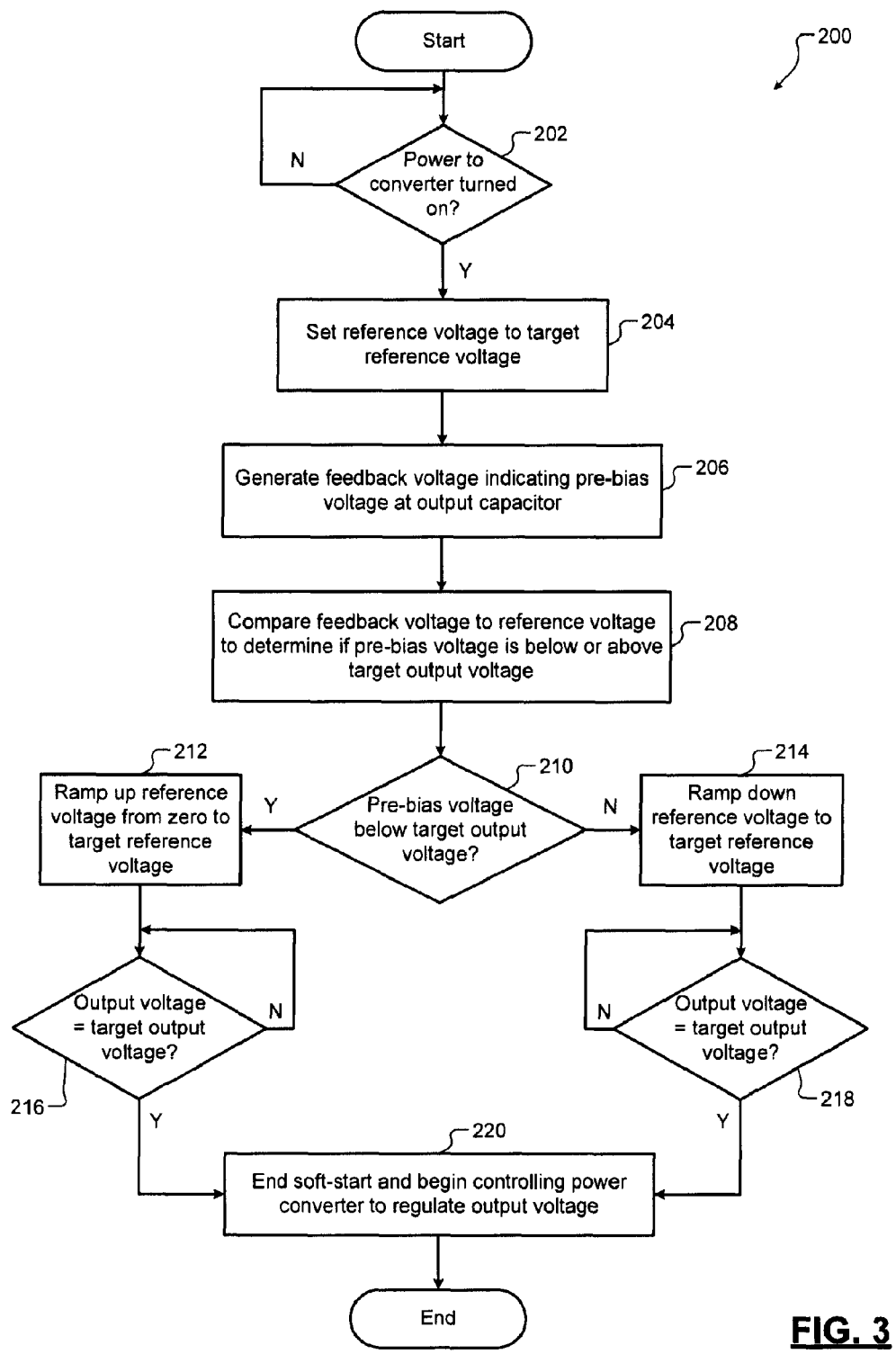
FIG. 3 is a flowchart of a method to soft-start a power converter according to the present disclosure.

Referring now to FIG. 3, a method 200 for performing soft-start for power converters according to the present disclosure is shown. At 202, control determines if power to the converter is turned on. At 204, if power is turned on, control sets (i.e., forces) an internal reference voltage V_REF to a target reference voltage V_REF_TARGET (i.e., V_REF=V_REF_TARGET). At 206, control generates a feedback voltage V_FB indicating a pre-bias voltage across an output capacitor C of the power converter.

At 208, control compares the feedback voltage V_FB to the target reference voltage V_REF_TARGET to determine if the pre-bias voltage across the capacitor C is below or above the target output voltage. At 210, control determines if the pre-bias voltage across the capacitor C is below the target output voltage (i.e., if V_REF_TARGET>V_FB).

At 212, if the pre-bias voltage across the capacitor C is below the target output voltage (i.e., if V_REF_TARGET>V_FB), control generates a positive ramp for soft-start (i.e., V_REF ramps up from V_REF_MIN=0V to V_REF_TARGET). Conversely, at 214, if the pre-bias voltage across the capacitor C is above the target output voltage (i.e., if V_REF_TARGET<V_FB), control generates a negative ramp for soft-start (i.e., V_REF ramps down from V_REF_MAX to V_REF_TARGET).

At 216 and 218, control determines if the output voltage across the capacitor C has reached the target output voltage (i.e., if the positive ramp or the negative ramp has ended, and V_REF=V_REF_TARGET). The output voltage across the capacitor C reaches the target output voltage (i.e., V_REF=V_REF_TARGET) at the end of the positive ramp or the negative ramp. At 220, at the end of the positive or negative V_REF ramp (i.e., when V_REF=V_REF_TARGET), control ends soft-start and begins controlling the power converter normally (e.g., in PWM mode) to regulate the output power delivered to the load.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
    a feedback module that communicates with a capacitor connected across an output of a power converter and that generates a feedback voltage indicating a pre-bias voltage across the capacitor before power is supplied to the power converter;
    a comparator that compares the feedback voltage to a reference voltage and that determines whether the pre-bias voltage across the capacitor is greater or less than a desired output voltage of the power converter when power is supplied to the power converter;
    a ramp generator module that generates a first ramp in response to the pre-bias voltage being less than the desired output voltage and that generates a second ramp in response to the pre-bias voltage being greater than the desired output voltage; and
    a control module that drives a high-side switch and a low-side switch of the power converter to charge the capacitor from the pre-bias voltage to the desired output voltage based on the first ramp, or discharge the capacitor from the pre-bias voltage to the desired output voltage based on the second ramp, and that controls the high-side switch and the low-side switch of the power converter after a voltage across the capacitor reaches the desired output voltage.

2. The system of claim 1 wherein the ramp generator module generates the reference voltage, wherein the reference voltage is set to a set-point corresponding to the desired output voltage when power is supplied to the power converter, and wherein the reference voltage is increased from a first value to the set-point based on the first ramp or decreased from a second value to the set-point based on the second ramp.

3. The system of claim 1 wherein the control module operates the power converter at a duty cycle after the voltage across the capacitor reaches the desired output voltage and regulates the voltage across the capacitor at the desired output voltage based on the duty cycle.

4. The system of claim 1 wherein the control module includes:
    a pulse width modulation controller that controls the high-side switch and the low-side switch at a duty cycle;
    an inductor having a first end connected to a node connecting the high-side switch to the low-side switch and a second end connected to the capacitor; and
    the capacitor,
    wherein the pulse width modulation controller controls the high-side switch and the low-side switch at the duty cycle and regulates the voltage across the capacitor at the desired output voltage based on the duty cycle after the voltage across the capacitor reaches the desired output voltage.

5. The system of claim 1 wherein the control module operates the power converter in a source-only mode during the first ramp and in a sink-only mode during the second ramp.

6. A method comprising:
generating a feedback voltage indicating a pre-bias voltage across a capacitor connected across an output of a power converter before power is supplied to the power converter;
comparing the feedback voltage to a reference voltage to determine whether the pre-bias voltage across the capacitor is greater or less than a desired output voltage of the power converter when power is supplied to the power converter;
generating a first ramp in response to the pre-bias voltage being less than the desired output voltage and charging the capacitor from the pre-bias voltage to the desired output voltage based on the first ramp;
generating a second ramp in response to the pre-bias voltage being greater than the desired output voltage and discharging the capacitor from the pre-bias voltage to the desired output voltage based on the second ramp; and
controlling the power converter after a voltage across the capacitor reaches the desired output voltage.

7. The method of claim 6 further comprising:
setting the reference voltage to a set-point corresponding to the desired output voltage when power is supplied to the power converter;
increasing the reference voltage from a first value to the set-point based on the first ramp; and
decreasing the reference voltage from a second value to the set-point based on the second ramp.

8. The method of claim 6 further comprising:
operating the power converter at a duty cycle after the voltage across the capacitor reaches the desired output voltage; and
regulating the voltage across the capacitor at the desired output voltage based on the duty cycle.

9. The method of claim 6 further comprising:
controlling a high-side switch and a low-side switch of the power converter using pulse width modulation at a duty cycle; and
regulating the voltage across the capacitor at the desired output voltage based on the duty cycle after the voltage across the capacitor reaches the desired output voltage.

10. The method of claim 6 further comprising:
operating the power converter in a source-only mode during the first ramp; and
operating the power converter in a sink-only mode during the second ramp.

* * * * *